(12) United States Patent
Hale

(10) Patent No.: US 6,330,581 B1
(45) Date of Patent: *Dec. 11, 2001

(54) APPARATUS AND A METHOD FOR ADDRESS GENERATION

(75) Inventor: Stephen C. Hale, San Jose, CA (US)

(73) Assignee: ATI International SRL, Hastings (BB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,881

(22) Filed: Sep. 8, 1998

(51) Int. Cl.[7] .................................................. G06F 7/50
(52) U.S. Cl. ......................... 708/709; 708/670; 708/707
(58) Field of Search ................................. 708/709, 706, 708/707, 670

(56) References Cited

U.S. PATENT DOCUMENTS

| | | | |
|---|---|---|---|
| 5,351,207 | * 9/1994 | Girard et al. ........................ | 708/708 |
| 5,583,806 | 12/1996 | Widigen et al. ...................... | 364/786 |
| 5,612,911 | * 3/1997 | Timko .................................. | 708/670 |
| 5,625,582 | * 4/1997 | Timko .................................. | 708/708 |
| 5,961,580 | * 10/1999 | Mahalingaiah ....................... | 708/670 |
| 6,003,125 | * 12/1999 | Shippy ................................. | 708/709 |

* cited by examiner

*Primary Examiner*—David H. Malzahn
(74) *Attorney, Agent, or Firm*—Skjerven Morrill MacPherson LLP

(57) ABSTRACT

The present invention provides an apparatus and a method for address generation. In one embodiment, an apparatus for an address generation unit of an ALU (Arithmetic Logic Unit) of a microprocessor includes a first carry-propagate adder that adds a lower 16 bits of a constant or displacement and a lower 16 bits of a segment base, and a second carry-propagate adder connected to the first carry-propagate adder, wherein the second carry-propagate adder adds a lower 16 bits of a base and an output of the first 16-bit carry-propagate adder to generate a lower 16 bits of an address. In one embodiment, the first carry-propagate adder and the second carry-propagate adder are each 16-bit carry-propagate adders.

22 Claims, 3 Drawing Sheets

US 6,330,581 B1

APPARATUS AND A METHOD FOR ADDRESS GENERATION

FIELD OF THE INVENTION

The present invention relates generally to microprocessors and, more particularly, to an apparatus and a method for address generation in an ALU (Arithmetic Logic Unit) in a microprocessor.

BACKGROUND OF THE INVENTION

A microprocessor typically includes a memory management subsystem that provides segmentation and paging. For example, the well known Intel X86™ /Pentium™ microprocessors include a memory management subsystem that provides a segment translator and a page translator.

Address generation in a microprocessor that implements segmentation and paging typically requires adding a constant or a displacement, a (logical) base, and a segment base to generate an address. For example, a typical address generation unit 100 is shown in prior art FIG. 1. Address generation unit 100 uses a 2-to-1 multiplexer to select either a constant or a displacement and then adds the multiplexer output, a (logical) base, and a segment base to generate a 32-bit address. In particular, prior art address generation unit 100 generates the lower 16 bits (bits [15:0]) of the 32-bit address by selecting either a constant or a displacement in a 16-bit multiplexer 110, adding the output value of multiplexer 110 to the lower 16 bits of the (logical) base in a 16-bit carry-propagate adder 102, and then adding the output value of 16-bit carry-propagate adder 102 and a lower 16 bits of the segment base using a 16-bit carry-propagate adder 104. Prior art address generation unit 100 generates the upper 16 bits (bits [31:16]) of the 32-bit address by selecting either a constant or a displacement in a 16-bit multiplexer 112, adding the output value of multiplexer 112 to the upper 16 bits of the base using a 16-bit carry-propagate adder 106, which receives a carry-in value from a carry-out value of 16-bit carry-propagate adder 102, clearing the output value of 16-bit carry-propagate adder 106 using 16-bit AND-gate 114, and then adding the output of 16-bit AND-gate 114 and an upper 16 bits of the segment base using a 16-bit carry-propagate adder 108, which receives a carry-in value from a carry-out value of 16-bit carry-propagate adder 104. The clearing or zeroing of the 16-bit carry-propagate adder 106 is used during 16-bit mode, in which only the lower 16 bits of the constant or displacement and the (logical) base affect the 32-bit address output. In 32-bit mode, the 16-bit AND-gate 114 output is equal to the 16-bit carry-propagate adder 106 output allowing all 32 bits of the constant or displacement and the (logical) base to affect the 32-bit address output. Accordingly, prior art address generation unit 100 generates the 32-bit address using 16-bit carry-propagate adders 102, 104, 106, and 108.

SUMMARY OF THE INVENTION

The present invention provides an apparatus and a method for address generation. In particular, the present invention provides a cost-effective and efficient apparatus and method for address generation in a microprocessor that includes a memory management subsystem that provides segmentation and paging.

In one embodiment, an apparatus includes a 32-bit 2-to-1 multiplexer for selecting either a constant or a displacement, a first 16-bit carry-propagate adder and a second 16-bit carry-propagate adder for adding a lower 16 bits (bits [15:0]) of the multiplexer output, a lower 16 bits of a segment base, and a lower 16 bits of a (logical) base to generate a lower 16 bits of a 32-bit address. In this embodiment, the apparatus also includes a first 16-bit carry-propagate adder, a second 16-bit carry-propagate adder, a third 16-bit carry-propagate adder, a 16-bit AND-gate, and a 16-bit carry-tree for generating an upper 16 bits (bits [31:16]) of the 32-bit address.

In one embodiment, the apparatus also includes a TLB (Translation Lookaside Buffer) that uses an upper 4 bits of the lower 16 bits (bits [15:12]) of the 32-bit address for a TLB lookup (or matching) operation. Further, the apparatus also includes a comparator that compares the upper 16 bits (bits [31:16]) of the 32-bit address to an output of the TLB for determining a TLB hit or miss.

In one embodiment, a method includes adding a lower 16 bits of a constant or displacement, a lower 16 bits of a segment base, and a lower 16 bits of a base using a first 16-bit carry-propagate adder and a second 16-bit carry-propagate adder to generate a lower 16 bits of a 32-bit address. In this embodiment, the method also includes generating an upper 16 bits of the 32-bit address using a third 16-bit carry-propagate adder and a fourth 16-bit carry-propagate adder.

In one embodiment, the method also includes transmitting an upper 4 bits of the lower 16 bits of the 32-bit address to a TLB, and transmitting a lower 12-bits of the lower 16 bits of the 32-bit address to a 12-bit page offset (e.g., the 12-bit page offset, which represents an offset within a page, can be used to provide the lower 12 bits (bits [11:0]) of a 32-bit physical address). Further, the method includes transmitting the upper 16 bits of the 32-bit address to a comparator for comparing the upper 16 bits of the 32-bit address to an output of the TLB for determining a TLB hit or miss.

Other aspects and advantages of the present invention will become apparent from the following detailed description and accompanying drawings.

DETAILED DESCRIPTION OF THE PRESENT INVENTION

The present invention provides an apparatus and a method for address generation. For example, a microprocessor that includes a memory management subsystem that provides segmentation and paging would particularly benefit from the apparatus and the method of the present invention.

Figure 1:
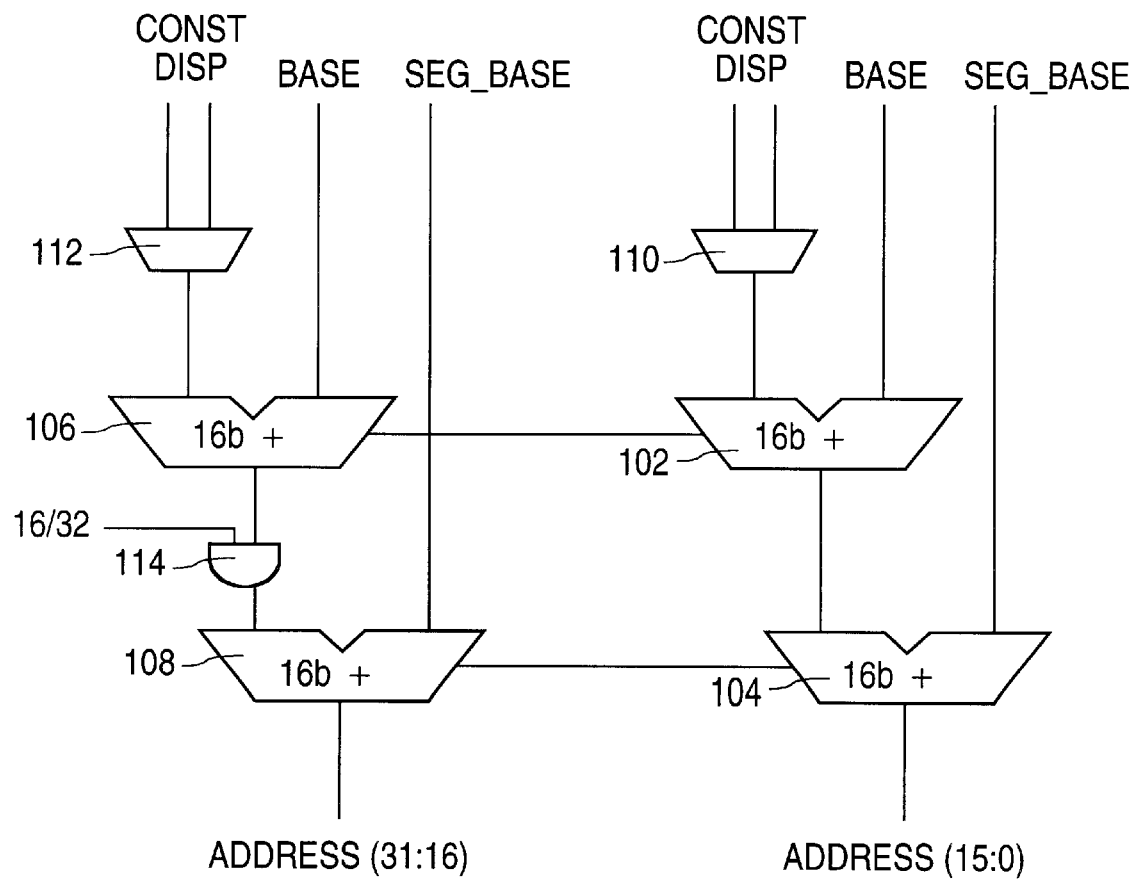
FIG. 1 is a block diagram of a prior art address generation unit.
Figure 2:
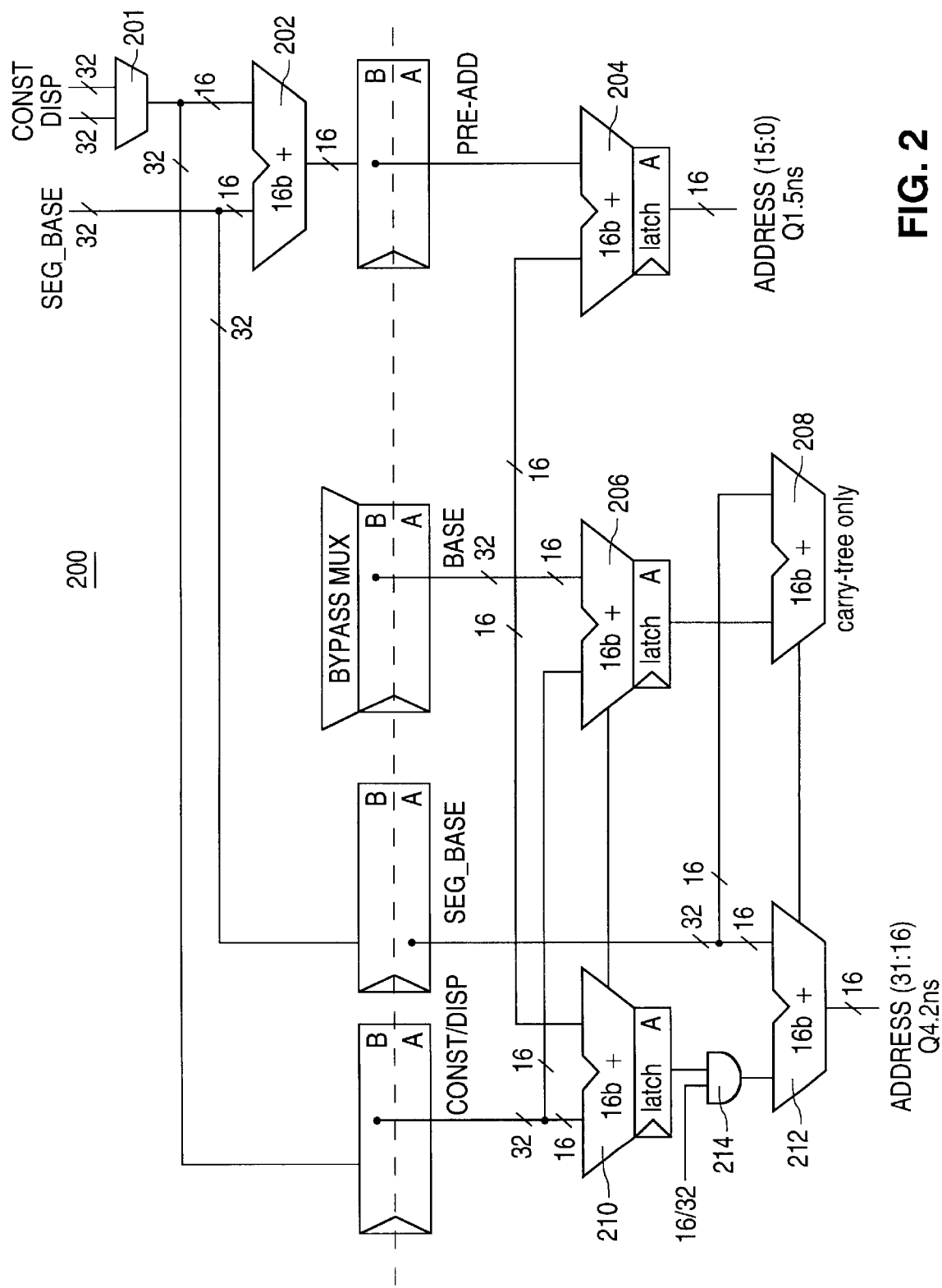
FIG. 2 is a block diagram of an address generation unit in accordance with one embodiment of the present invention.

FIG. 2 is a block diagram of an address generation unit 200 in accordance with one embodiment of the present invention. Address generation unit 200 includes a 32-bit 2-to-1 multiplexer 201, a 16-bit carry-propagate adder 202, and a 16-bit carry-propagate adder 204. In particular, 32-bit 2-to-1 multiplexer 201 selects either a 32-bit constant or a 32-bit displacement as an input to address generation. Subsequently, 16-bit carry-propagate adder 202 adds a lower 16 bits (bits [15:0]) of multiplexer 201 output (i.e., a constant (for pre-increment or pre-decrement addressing) or a displacement) and a lower 16 bits of a segment base in the cycle preceding the address generation cycle and outputs a 16-bit sum. Subsequently, 16-bit carry-propagate adder 204 adds the output of 16-bit carry-propagate adder 202 and a lower 16 bits of a (logical) base during the address generation cycle to generate a lower 16 bits of a 32-bit address.

Accordingly, address generation unit 200 generates the lower 16 bits of the 32-bit address relatively rapidly, because address generation unit 200 only adds the 16-bit carry-propagate adder 202 output and the lower 16 bits of the (logical) base using 16-bit carry-propagate adder 204 during the address generation cycle, instead of using 16-bit carry-propagate adders 102 and 104 as in prior art address generation unit 100. The speed advantage of address generation unit 200 leads to substantial cycle time reduction, such as cycle time reductions of 25%.

Moreover, in one embodiment, address generation unit 200 implements the addition of the lower 16 bits of the constant or displacement, the lower 16 bits of the segment base, and the lower 16 bits of the base, in the order described above, because the constant, the displacement, and the segment base are received by address generation unit 200 before the (logical) base. In particular, address generation unit 200 adds the lower 16 bits of either a constant or a displacement and the lower 16 bits of the segment base to generate a first 16-bit sum, and then address generation unit 200 adds the first 16-bit sum and the lower 16 bits of the (logical) base to generate the lower 16 bits of the 32-bit address.

Address generation unit 200 in generating the lower 16 bits of the 32-bit address does not generate any carry outputs. Thus, address generation unit 200 also includes a 16-bit carry-propagate adder 206 and a 16-bit carry-propagate tree 208 to calculate the carries in order to correctly generate the upper 16 bits (bits ([31:16]) of the 32-bit address.

In particular, address generation unit 200 adds the lower 16 bits of the constant or the displacement and the lower 16 bits of the base using 16-bit carry-propagate adder 206, which provides a carry-out value. Address generation unit 200 then adds an upper 16 bits (bits [31:16]) of the constant or the displacement and an upper 16 bits of the base using a 16-bit carry-propagate adder 210, which uses a carry-in value from the carry-out value of 16-bit carry-propagate adder 206. Address generation unit 200 clears the (sum) output of 16-bit carry-propagate adder 210 using 16-bit AND-gate 214 based on 16 or 32-bit mode. Address generation unit 200 adds the lower 16 bits of the segment base and the (sum) output of 16-bit carry-propagate adder 206 using 16-bit carry-propagate tree 208, which provides a carry-out value. Address generation unit 200 then adds the 16-bit AND-gate output and the upper 16 bits of the segment base using a 16-bit carry-propagate adder 212, which uses a carry-in value from the carry-out value of 16-bit carry-propagate tree 208.

Thus, address generation unit 200 generates the upper 16 bits of the 32-bit address (i.e., the (sum) output of 16-bit carry-propagate adder 212). In one embodiment, address generation unit 200 efficiently generates the upper 16 bits of the 32-bit address in sufficient time so as not to impact cycle time.

Accordingly, address generation unit 200 efficiently generates the lower 16 bits of the 32-bit address. Address generation unit 200 generally requires more time to generate the upper 16 bits of the 32-bit address than adders 202 and 204 to generate the lower 16 bits. However, this approach is particularly advantageous for various applications as discussed below with respect to FIG. 3.

Figure 3:
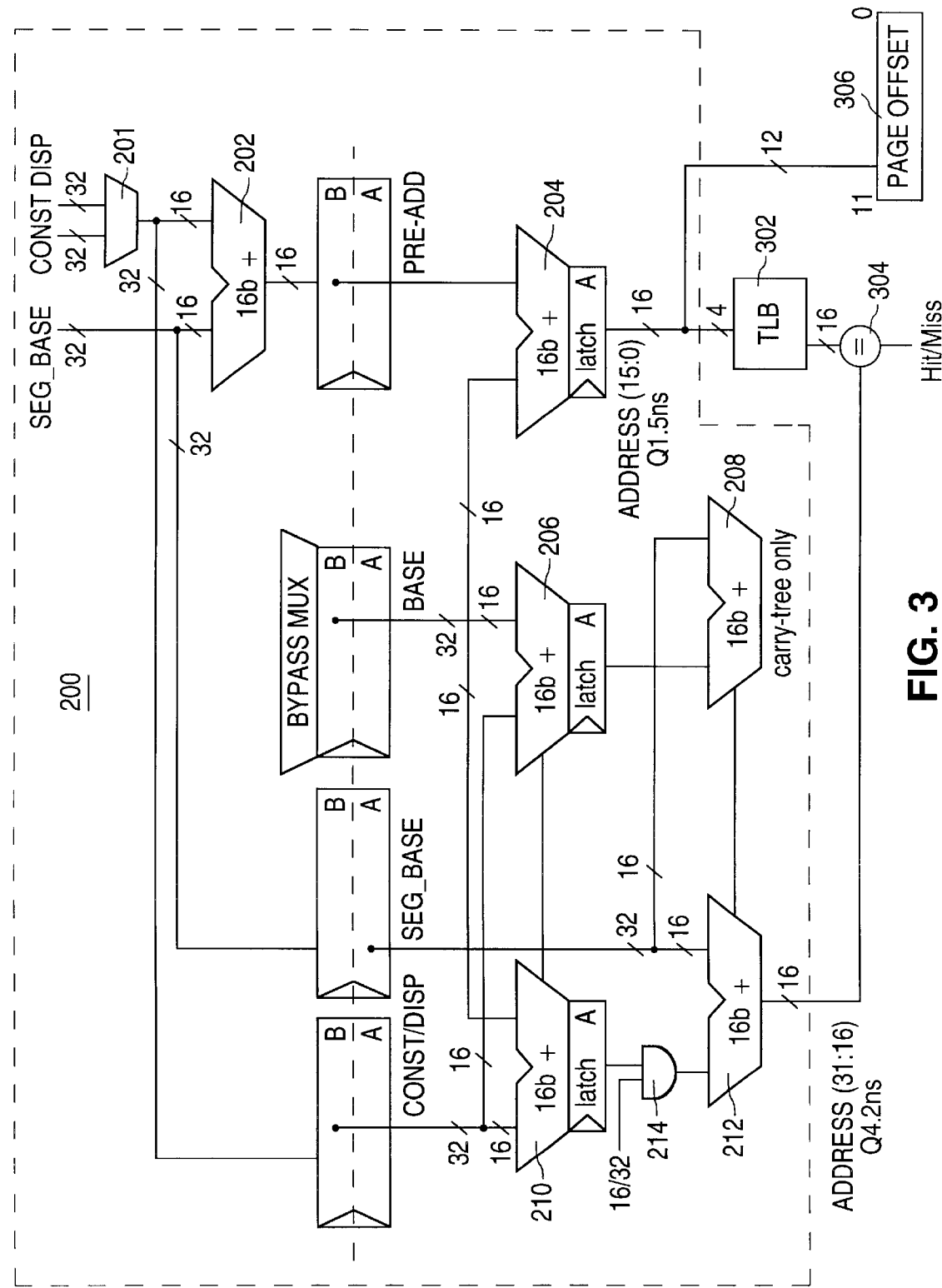
FIG. 3 is a functional diagram of an address generation unit connected to a TLB (Translation Lookaside Buffer) in accordance with one embodiment of the present invention.

FIG. 3 is a block diagram of address generation unit 200 connected to a TLB (Translation Lookaside Buffer) 302 in accordance with one embodiment of the present invention. In particular, the lower 16 bits of the 32-bit address generated by address generation unit 200, which are generated relatively rapidly, are advantageously used in this embodiment. In particular, the upper 4-bits of the lower 16 bits (bits [15:12]) of the 32-bit address are transmitted to TLB 302, and TLB 302 then performs a TLB lookup (or matching) operation. For example, a 4-entry fully associative TLB for variable size pages is discussed in a commonly assigned U.S. patent application Ser. No. 09/146,484 entitled "AN APPARATUS AND A METHOD FOR VARIABLE SIZE PAGES USING FIXED SIZE TLB TRANSLATION LOOK A SIDE BUFFER ENTRIES", which is herein incorporated by reference in its entirety. Also, the lower 12 bits of the lower 16 bits (bits [11:0]) of the 32-bit address are used for a 12-bit page offset 306 (e.g., the 12-bit page offset, which represents an offset within a page, can be used to provide the lower 12 bits (bits [11:0]) of a physical address).

Further, the upper 16 bits of the 32-bit address generated by address generation unit 200, which require more time to generate than the lower 16 bits of the 32-bit address, are transmitted to a comparator 304. Comparator 304 compares the upper 16 bits of the 32-bit address to an output of TLB 302 for determining a TLB hit or miss.

Accordingly, in FIG. 3, the upper 4 bits of the lower 16 bits of the 32-bit address, which are generated before the upper 16 bits of the 32-bit address, are advantageously used by TLB 302. In particular, TLB 302 uses the upper 4 bits of the lower 16 bits of the 32-bit address to perform a TLB lookup operation while the address generation unit 200 continues to generate the upper 16 bits of the 32-bit address. Moreover, the lower 12 bits of the lower 16 bits of the 32-bit address, which are generated before the upper 16 bits of the 32-bit address, are also advantageously used as shown in FIG. 3. In particular, the lower 12 bits of the lower 16 bits of the 32-bit address are transmitted to 12-bit page offset 306 while the address generation unit 200 continues to generate the upper 16 bits of the 32-bit address.

Although particular embodiments of the present invention have been shown and described, it will be apparent to those skilled in the art that changes and modifications may be made without departing from the present invention in its broader aspects, and therefore, the appended claims are to encompass within their scope all such changes and modifications that fall within the true scope of the present invention.

What is claimed is:

1. An apparatus for an address generation unit of an ALU (Arithmetic Logic Unit) of a microprocessor comprising:
   a first carry-propagate adder that adds a lower group of constant or displacement bits and a lower group of segment base bits;
   a second carry-propagate adder connected to the first carry-propagate adder, wherein the second carry-propagate adder adds a lower group of base bits and an output of the first carry-propagate adder to generate a lower group of address bits; and
   a TLB (Translation Lookaside Buffer) connected to the second carry-propagate adder.

2. The apparatus of claim 1 wherein the first adder and the second carry-propagate adder are each 16-bit carry-propagate adders.

3. The apparatus of claim 1 further comprising:
   a third carry-propagate adder connected to a fourth carry-propagate adder, wherein the third carry-propagate adder and the fourth carry-propagate adder generate an upper group of address bits, wherein the address is a 32-bit address.

4. An apparatus for an address generation unit of an ALU (Arithmetic Logic Unit) of a microprocessor comprising:
 a first carry-propagate adder that adds a lower group of constant or displacement bits and a lower group of segment base bits;
 a second carry-propagate adder connected to the first carry-propagate adder, wherein the second carry-propagate adder adds a lower group of base bits and an output of the first carry-propagate adder to generate a lower group of address bits;
 a third carry-propagate adder for adding an upper group of constant or displacement bits and an upper group of base bits;
 a fourth carry-propagate adder for adding an upper group of segment base bits and an output of the third carry-propagate adder to generate an upper group of address bits; and
 a TLB (Translation Lookaside Buffer) connected to the second carry-propagate adder.

5. The apparatus of claim 4, wherein the address is a 32-bit address, the lower group of address bits is a lower 16 bits of the 32-bit address, an input of the TLB is connected to an upper 4 bits of the lower 16 bits of the 32-bit address output by the second carry-propagate adder, and a lower 12 bits of the 32-bit address output by the second carry-propagate adder are used as a 12-bit page offset.

6. The apparatus of claim 5 further comprising:
 a comparator, a first input of the comparator connected to the fourth carry-propagate adder, and a second input of the comparator connected to an output of the TLB.

7. The apparatus of claim 4 wherein the first adder and the second carry-propagate adder are each 16-bit carry-propagate adders.

8. The apparatus of claim 4 further comprising:
 a third carry-propagate adder connected to a fourth carry-propagate adder, wherein the third carry-propagate adder and the fourth carry-propagate adder generate an upper group of address bits, wherein the address is a 32-bit address.

9. An apparatus for an address generation unit of an ALU (Arithmetic Logic Unit) of a microprocessor comprising:
 a first carry-propagate adder that adds a lower group of constant or displacement bits and a lower group of segment base bits;
 a second carry-propagate adder connected to the first carry-propagate adder, wherein the second carry-propagate adder adds a lower group of base bits and an output of the first carry-propagate adder to generate a lower group of address bits;
 a third carry-propagate adder for adding an upper group of constant or displacement bits and an upper group of base bits;
 a fourth carry-propagate adder for adding an upper group of segment base bits and an output of the third carry-propagate adder to generate an upper group of address bits;
 a fifth carry-propagate adder for adding the lower group of constant or displacement bits and the lower group of base bits, wherein the fifth 16-bit carry-propagate adder provides a carry-out value to a carry-in of the third carry-propagate adder; and
 a carry tree that receives the lower group of segment base bits and an output of the fifth carry-propagate adder, wherein the carry tree provides a carry-out value to a carry-in of the fourth carry-propagate adder.

10. The apparatus of claim 9 wherein the first adder and the second carry-propagate adder are each 16-bit carry-propagate adders.

11. The apparatus of claim 9 further comprising:
 a third carry-propagate adder connected to a fourth carry-propagate adder, wherein the third carry-propagate adder and the fourth carry-propagate adder generate an upper group of address bits, wherein the address is a 32-bit address.

12. A method for generating an address, the method comprising:
 adding a lower group of constant or displacement bits and a lower group of segment base bits using a first carry-propagate adder to provide a first sum;
 adding a lower group of base bits and the first sum using a second carry-propagate adder to generate a lower group of address bits; and transmitting an upper 4 bits of the lower group of address bits to a TLB (Translation Lookaside Buffer).

13. The method of claim 12 wherein the lower group of address bits is a lower 16 bits of a 32-bit address, and a lower 12 bits of the lower 16 bits of the 32-bit address are used as a 12-bit page offset.

14. The method of claim 13 further comprising:
 transmitting the upper 16 bits of the 32-bit address to a comparator; and comparing the upper 16 bits of the 32-bit address to an output of the TLB.

15. A method for generating an address, the method comprising:
 adding a lower group of constant or displacement bits and a lower group of segment base bits using a first carry-propagate adder to provide a first sum; adding a lower group of base bits and the first sum using a second carry-propagate adder to generate a lower group of address bits;
 adding a constant or displacement, a base, and a segment base to generate an upper group of address bits; and
 transmitting an upper 4 bits of the lower group of address bits to a TLB (Translation Lookaside Buffer).

16. The method of claim 15 wherein the lower group of address bits is a lower 16 bits of a 32-bit address, and a lower 12 bits of the lower 16 bits of the 32-bit address are used as a 12-bit page offset.

17. The method of claim 16 further comprising:
 transmitting the upper 16 bits of the 32-bit address to a comparator; and
 comparing the upper 16 bits of the 32-bit address to an output of the TLB.

18. An apparatus comprising:
 a first 16-bit carry-propagate adder;
 a second 16-bit carry-propagate adder, an input of the second 16-bit carry-propagate adder connected to an output of the first 16-bit carry-propagate adder, wherein the first 16-bit carry-propagate adder and the second 16-bit carry-propagate adder add a lower 16 bits of a constant or displacement, a lower 16 bits of a segment base, and a lower 16 bits of a base to generate a lower 16 bits of a 32-bit address;
 a third 16-bit carry-propagate adder;
 a fourth 16-bit carry-propagate adder, wherein a carry-out of the third 16-bit carry-propagate adder is connected to a carry-in of the fourth 16-bit carry-propagate adder;

a 16-bit carry tree, wherein an input of the 16-bit carry tree is connected to an output of the third 16-bit carry-propagate adder; and a fifth 16-bit carry-propagate adder, wherein an input of the fourth 16-bit carry-propagate adder is connected to an output of the third 16-bit carry-propagate adder, and a carry-in of the fifth 16-bit carry-propagate adder is connected to a carry-out of the 16-bit carry tree, and wherein the third 16-bit carry-propagate adder, the fourth 16-bit carry-propagate adder, the fifth 16-bit carry-propagate adder, and the 16-bit carry tree generate an upper 16 bits of the 32-bit address.

19. The apparatus of claim 8 further comprising:

a TLB (Translation Lookaside Buffer) connected to an output of the second 16-bit carry-propagate adder.

20. The apparatus of claim 19 wherein the fourth 16-bit carry-propagate adder adds an upper 16 bits of the constant or displacement and an upper 16 bits of the base, and the third 16-bit carry-propagate adder adds a lower 16 bits of the constant or displacement and a lower 16 bits of the base.

21. The apparatus of claim 20 wherein the 16-bit carry tree adds the output of the third 16-bit carry-propagate adder and a lower 16 bits of the segment base, and the fifth 16-bit carry-propagate adder adds the output of the third 16-bit carry-propagate adder and the upper 16 bits of the segment base.

22. The apparatus of claim 19 further comprising:

a comparator, a first input of the comparator connected to an output of the fifth 16-bit carry-propagate adder, a second input of the comparator connected to an output of the TLB, wherein the comparator compares the upper 16 bits of the 32-bit address to an output of the TLB.

* * * * *